US007590236B1

(12) United States Patent
Boneh et al.

(10) Patent No.: US 7,590,236 B1
(45) Date of Patent: Sep. 15, 2009

(54) IDENTITY-BASED-ENCRYPTION SYSTEM

(75) Inventors: Dan Boneh, Palo Alto, CA (US); Xavier Boyen, Palo Alto, CA (US)

(73) Assignees: Voltage Security, Inc., Palo Alto, CA (US); The Board of Trustees of the Leland Stanford Junior University, Palo Alto, CA (US)

( * ) Notice: Subject to any disclaimer, the term of this patent is extended or adjusted under 35 U.S.C. 154(b) by 800 days.

(21) Appl. No.: 11/090,450

(22) Filed: Mar. 25, 2005

Related U.S. Application Data

(60) Provisional application No. 60/577,240, filed on Jun. 4, 2004, provisional application No. 60/579,061, filed on Jun. 10, 2004, provisional application No. 60/579,586, filed on Jun. 14, 2004.

(51) Int. Cl.
*H04K 1/00* (2006.01)
*H04L 9/00* (2006.01)
*H04L 9/30* (2006.01)
*H04L 29/06* (2006.01)
*H04L 9/32* (2006.01)

(52) U.S. Cl. .................. 380/30; 380/28; 380/44; 380/277; 380/285; 713/150; 713/168

(58) Field of Classification Search .................. 380/28, 380/285, 30, 44, 277
See application file for complete search history.

(56) References Cited

U.S. PATENT DOCUMENTS

| 7,353,395 B2 * | 4/2008 | Gentry et al. ............... 713/171 |
| 2003/0081785 A1 * | 5/2003 | Boneh et al. ............... 380/277 |
| 2004/0179684 A1 * | 9/2004 | Appenzeller et al. ........... 380/44 |
| 2005/0071632 A1 * | 3/2005 | Pauker et al. ............... 713/165 |
| 2005/0102512 A1 * | 5/2005 | Goh et al. .................. 713/168 |
| 2005/0138353 A1 * | 6/2005 | Spies et al. ................ 713/153 |

OTHER PUBLICATIONS

Stam, M., "Speeding up Subgroup Cryptosystems," ISBN 90-386-0692-3, published in 2003, pp. 5-43.*
Jae Choon Cha et al., "An Identity-Based Signature from Gap Diffie-Hellman Groups," 2003, Springer-Verlag Berlin Heidelberg, pp. 18-30.*
Xavier Boyen, "Multipurpose Identity-Based Signcryption, A Swiss Army Knife for Identity-Based Cryptography," 2003, International Association for Cryptologic Research, pp. 383-399.*

(Continued)

*Primary Examiner*—Emmanuel L Moise
*Assistant Examiner*—Luu Pham
(74) *Attorney, Agent, or Firm*—Treyz Law Group; G. Victor Treyz

(57) ABSTRACT

Systems and methods for supporting symmetric-bilinear-map and asymmetric-bilinear-map identity-based-encryption (IBE) key exchange and encryption schemes are provided. IBE key exchange schemes use an IBE encapsulation engine to produce a secret key and an encapsulated version of the secret key. An IBE unencapsulation engine is used to unencapsulate the encapsulated key. IBE encryption schemes use an IBE encryption engine to produce ciphertext from plaintext. An IBE decryption engine is used to decrypt the ciphertext to reveal the plaintext. The IBE unencapsulation engine and decryption engines use bilinear maps. The IBE encapsulation and encryption engines perform group multiplication operations without using bilinear maps, improving efficiency. IBE private keys for use in decryption and unencapsulation operations may be generated using a distributed key arrangement in which each IBE private key is assembled from private key shares.

20 Claims, 5 Drawing Sheets

OTHER PUBLICATIONS

Jeremy Horwitz et al., "Toward Hierarchical Identity-Based Encryption," 2002, Springer-Berlag Berlin Heidelberg, pp. 466-481.*

Benoit Libert et al., "Efficient Revocation and Threshold Pairing Based Cryptosystem," 2003, ACM 1-58113-708-7/03/0007.*

Ran Canetti et al., "An Efficient Threshold Public Key Cryptosystem Secure Against Adaptive Chosen Ciphertext Attack", Eurocrypt '99, LNCS 1592, pp. 90-106 (c) Springer-Verlag (1999).

Moni Naor et al., "Public-Key Cryptosystems Provably Secure Against Chosen Ciphertext Attacks" (1995).

Moni Naor et al., "Universal One-Way Hash Functions and their Cryptographic Applications" (1995).

Victor S. Miller, "Short Programs for Functions on Curves", (1986).

Yehuda Lindell, "A Simpler Constructions of CCA2-Secure Public-Key Encryption Under General Assumptions" (Jan. 19, 2004).

Ronald Cramer et al. "A Practical Public Key Cryptosystem Provably Secure Against Adaptive Chosen Ciphertext Attack", (May 1998).

Miher Bellare et al., "Random Oracles are Practical: A Paradigm for Designing Efficient Protocols", Proceedings of the First ACM Conference on Computer and Communications Secureity, ACM, pp. 1-20, Nov. 1993.

Dan Boneh et al., "Identity-Based Encryption from the Weil Pairing," Siam J. of Computing, vol. 32, No. 3, pp. 586-615, 2003.

Michael Steiner et al., "Diffie-Hellman Key Distribution Extended to Group Communication", proceedings of the 3rd ACM Conference on Computer and Communications Security, Mar. 14-16, 1996.

Clifford Cocks, "An Identity Based Encryption Scheme Based on Quadratic Residues" (2001).

Jeremy Horwits and Ben Lynn, "Toward Hierarchical Identity-Based Encryption," Advances in Cryptology: Eurocrypt 2002, Lecture Notes in Computer Science, vol. 2332, pp. 466-481, 2002.

Eli Biham et al., "Breaking Generalized Diffie-Hellman Modulo a Composite is no Easier than Factoring", (1998).

Dan Boneh et al., "Applications of Multilinear Forms to Cryptography" (2002).

Dan Boneh et al., "Improved Efficiency for CCA-Secure Cryptosystems Built Using Identity-Based Encryption" (2nd half of 2004).

Ran Canetti et al., "A Forward-Secure Public-Key Encryption Scheme" (2003).

Moni Naor et al. "Number-Theoretic Constructions of Efficient Pseudo-Random Functions" (undated).

Anna Lysyanskaya, "Unique Signatures and Verifiable Random Functions from the DH-DDH Separation" (undated).

Kaoru Kurosawa et al., "A New Paradigm of Hybrid Encryption Scheme" (undated).

Craig Gentry et al., "Hierarchical ID-Based Cryptography" (undated).

Ryuichi Sakai et al., "ID Based Cryptosystems with Pairing on Elliptic Curve" (undated).

Ueli M. Maurer et al. "A Non-Interactive Public-Key Distribution System" (undated).

Brent Waters "Efficient Identity-Based Encryption Without Random Oracles" (undated).

Ran Canetti et al., "Chosen-Ciphertext Security from Identity-Based Encryption" (undated).

* cited by examiner

IDENTITY-BASED-ENCRYPTION SYSTEM

This application claims the benefit of provisional patent application No. 60/577,240, filed Jun. 4, 2004, provisional patent application No. 60/579,061, filed Jun. 10, 2004, and provisional patent application No. 60/579,586, filed Jun. 14, 2004, each of which is hereby incorporated by reference herein in its entirety.

This invention was made in the course of U.S. contract No. CCR-02055733 awarded by the National Science Foundation. The U.S. Government has certain rights in the invention.

BACKGROUND OF THE INVENTION

This invention relates to cryptographic systems, and more particularly, to identity-based-encryption (IBE) systems with improved encryption efficiency.

It is often desirable to encrypt sensitive electronic communications such as email messages. With symmetric key cryptographic arrangements, the sender of a message uses the same key to encrypt the message that the recipient of the message uses to decrypt the message. Symmetric key systems require that each sender and recipient exchange a shared key in a secure manner.

With public key cryptographic systems, two types of keys are used—public keys and private keys. Senders may encrypt messages using the public keys of recipients. Each recipient has a private key that is used to decrypt the messages for that recipient.

To ensure the authenticity of the public keys in traditional public key systems and thereby defeat possible man-in-the-middle attacks, public keys may be provided to senders with a certificate signed by a trusted certificate authority. The certificate may be used to verify that the public key belongs to the intended recipient of the sender's message. Public key encryption systems that use this type of traditional approach are said to use the public key infrastructure (PKI) and are referred to as PKI cryptographic systems.

Identity-based-encryption (IBE) public key cryptographic systems have also been proposed. As with PKI cryptographic systems, a sender in an IBE system may encrypt a message for a given recipient using the recipient's public key. The recipient may then decrypt the message using the recipient's corresponding private key. The recipient can obtain the private key from an IBE private key generator.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

One IBE scheme that has been proposed is the so-called Boneh-Franklin (BF) scheme. The BF IBE scheme uses bilinear mappings during both encryption and decryption operations. Although the BF scheme is efficient in terms of time and bandwidth, encryption and decryption operations can take longer than corresponding operations in conventional PKI schemes.

It would therefore be desirable to be able to provide IBE schemes with improved efficiency.

SUMMARY OF THE INVENTION

The present invention provides identity-based-encryption (IBE) cryptosystems and methods for using these cryptosystems. The systems and methods of the invention may be used to support IBE key exchange schemes and IBE encryption schemes.

In IBE key exchange schemes, an IBE encapsulation engine is used at a sender to generate a random secret key K and an encapsulated version of the key E. The encapsulated key E may be transmitted to a recipient. The recipient can use an IBE unencapsulation engine to recover the secret key K from the encapsulated key E.

In IBE encryption schemes, an IBE encryption engine is used at a sender to encrypt plaintext M into ciphertext C. The ciphertext C may then be transmitted electronically to a desired recipient. At the recipient, the recipient can use an IBE decryption engine to decrypt the ciphertext and thereby reveal the plaintext.

The IBE schemes of the present invention use bilinear groups and bilinear mappings. Efficiency is enhanced by using the IBE encapsulation engine and IBE encryption engine to perform their functions using only group multiplication operations without using the bilinear maps. Bilinear maps are used by the IBE unencapsulation engine and the IBE decryption engine.

A distributed key arrangement may be used in which IBE private keys are constructed from multiple private key shares.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to cryptographic systems and methods. The invention uses hardware (computing equipment) and software to implement identity-based-encryption (IBE) schemes. Identity-based-encryption schemes are so named because the public key of the recipient can be based on identity information such as the recipient's email address, name, or social security number. The IBE cryptographic systems and methods of the present invention may be used to support IBE encryption-decryption operations and IBE key exchange operations.

Computing equipment is used to implement an IBE private key generator and, if desired, an IBE public parameter host. Senders and recipients of encrypted messages or encapsulated keys use computing equipment to run IBE encryption and decryption engines (also sometimes called IBE encapsulation and unencapsulation engines). The computing equipment includes hardware such as processors and storage (e.g., fixed and removable storage media). The computing equipment may be electrically linked through a communications network. This allows users to communicate electronically (e.g., to send encrypted messages and encapsulated keys through email or other electronic channels, to request private keys electronically, to obtain IBE public parameters electronically, etc.). The software of the present invention includes code that, when installed and run on the hardware of the system, configures the system to perform the methods of the invention (e.g., method steps such as those described in connection with the flow charts and diagrams of the FIGS).

The cryptographic systems and methods of the present invention can be used in two contexts: 1) in contexts in which IBE cryptographic operations are performed to exchange a message securely between a sender and receiver and 2) in contexts in which IBE key-exchange operations are performed to exchange a key between a sender and a receiver. The first type of scheme is referred to herein as an IBE encryption scheme. The second situation is referred to as an IBE key exchange scheme.

In an IBE encryption scheme, a sender desires to securely convey a message to a recipient. The contents of the message is generally referred to as plaintext. The plaintext may include text, audio, video, executable code, a cryptographic key, or any other suitable data. The encrypted version of the plaintext is called ciphertext.

In an IBE key exchange scheme, a sender desires to securely convey a random cryptographic key to a recipient. The key is randomly generated as part of the key encapsulation process and encrypted before transmission to the recipient. The encrypted version of the key is said to be encapsulated and the IBE process used to generate and encrypt the key is referred to as encapsulation.

Figure 1:
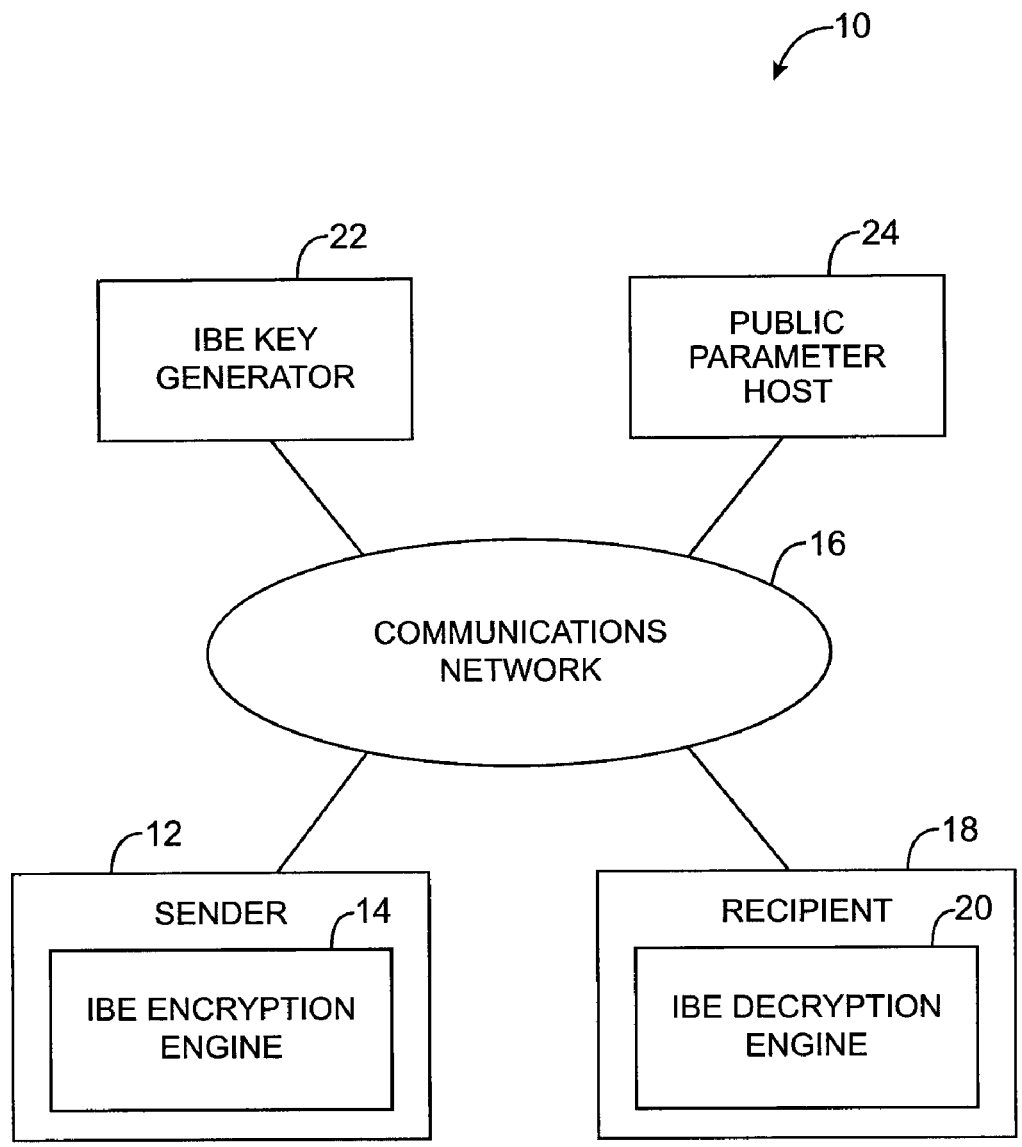
FIG. 1 is a diagram of an illustrative system in which messages may be encrypted and decrypted using identity-based-encryption (IBE) techniques in accordance with the present invention.

An illustrative system 10 that may use identity-based-encryption (IBE) operations in both the IBE encryption context and the IBE key exchange context are shown in FIG. 1. Senders, recipients, and other entities in the systems of the present invention such as system 10 may be associated with individuals, organizations, or any other suitable users.

In system 10, a sender may send an encapsulated key or ciphertext to a recipient over a communications network 16. The encapsulated key or ciphertext may be conveyed in an electronic transmission such as an email message or using any other suitable arrangement. Client software (e.g., email programs or other communications applications) may be may be used to handle electronic communications in system 10.

Senders and recipients may communicate with each other using equipment 12 and 18. Equipment 12 and 18 (and the equipment for the other entities in the system) may be any suitable computing equipment. Suitable computing equipment for implementing the methods of the invention may include, for example, computing equipment such as a personal computers, portable computers, workstations, mainframe computers, networked computers or terminals such as computer terminals that are connected to the Internet using a host computer in a local area network, handheld devices, smartcards, special-purpose hardware (e.g., hardware based on a custom design or other computing equipment with less general-purpose functionality than a general purpose computer), or any suitable electronic equipment.

The equipment of FIG. 1 may be interconnected by communications paths in communications network 16. Network 16 may include the Internet and other wide area networks, one or more local area networks, switched telephone networks, networks such as virtual private networks, networks including dedicated leased lines, networks based on wired or wireless paths, or any other networks formed using any other suitable network technology.

An IBE encryption engine 14 is used for encryption operations. So-called IBE public parameters and the identity-based public key of a desired recipient are used as inputs to the IBE encryption engine. An IBE decryption engine 20 is used for decryption operations. Decryption is performed using an IBE private key corresponding to the IBE public key used during encryption. The recipient obtains the IBE private key from IBE private key generator 22. Once the IBE private key has been obtained, it is typically stored (cached) locally for future use. With an IBE private key caching arrangement, it is generally not necessary for a recipient to request a copy of the IBE private key prior to each decryption. Unless the cached version of the IBE private key has expired, the recipient can use the copy of the IBE private key that is maintained in the cache to perform decryption operations. The recipient may request and obtain his private key before or after receiving a ciphertext.

In the IBE encryption scheme, the sender uses IBE encryption engine 14 at equipment 12 to encrypt the plaintext message into ciphertext before sending ciphertext to the recipient. At the recipient, the recipient uses IBE decryption engine 20 to decrypt the ciphertext to obtain access to the plaintext.

In the IBE key exchange scheme, the sender uses the IBE encryption engine 14 (which is serving as an IBE encapsulation engine) to generate an encapsulated key. At the recipient, the recipient uses the IBE decryption engine 20 (which is serving as an IBE unencapsulation engine) to decrypt the encapsulated key (i.e., to remove the encapsulation) and thereby obtain access to the key.

During setup operations, IBE key generator 22 generates or obtains a master secret and uses the master secret in generating the IBE public parameters. The IBE public parameters are published so that they are available to senders in system 10. Any suitable technique may be used to publish the IBE public parameters. For example, the IBE public parameters can be provided to senders by the IBE key generator 22, can be listed in a directory, or can be provided to a sender by a recipient in a peer-to-peer fashion. With one suitable arrangement, the IBE public parameters are published by placing them on a publicly-accessible IBE public parameter host 24.

In the following discussion, G and V are two cyclic groups of prime order p, where in each group the group operation is denoted multiplicatively, and henceforth referred to as group multiplication. G has a generator denoted g. There is a bilinear map e such that e: G×G→V. In the IBE encryption context, the message data to be encrypted is called plaintext M. M may be any data including a key, a text message, video or audio content, executable code, other data, etc. The encrypted version of plaintext M is called ciphertext C. In the IBE key exchange context, K denotes a cryptographic key (which can be used for message encryption or other applications) and E denotes the IBE-encapsulated (encrypted) version of K.

The IBE public key of the recipient is ID. The public key ID may be an arbitrary string (e.g., a string based on the recipient's email address or other identity information associated with the recipient), which is to say that ID may be an arbitrary element of the set $\{0,1\}^*$. The IBE private key of the recipient that is associated with IBE public key ID is called $d_{ID}$. The function H is a cryptographic hash function from the set $\{0,1\}^*$ of possible IDs to the numbers from 1 to p−1, denoted $Z_p^*$. H' is a cryptographic hash function that maps elements of V to strings of length l. The so-called IBE public parameters for the system 10 are denoted "params." The master secret used to generate private keys $d_{ID}$ is called "master-key."

The bilinear map e must exhibit bilinearity and non-degeneracy. According to the bilinearity property, for all u, v∈G and a, b∈Z, we have $e(u^a, v^b) = e(u,v)^{ab}$. According to the non-degeneracy property, $e(g,g) \ne 1$.

The group G is preferably chosen such that group multiplication can be performed efficiently. The bilinear map e: G×G→V is preferably also chosen to be efficiently computable.

The present invention requires that either the computational or decisional bilinear Diffie-Hellman (BDH) assumption be satisfied. Under the computational BDH assumption, it is hard to compute $e(g,g)^{abc} \in V$ given only g, $g^a$, $g^b$, and $g^c \in G$. Under the decisional BDH assumption it is hard to distinguish $e(g,g)^{abc} \in V$ from a random element of V given only g, $g^a$, $g^b$, and $g^c$ in G. In stating these complexity assumptions, the exponents a, b, and c are randomly chosen in $Z_p = \{0, 1, \ldots p-1\}$.

The IBE key exchange scheme may be implemented using a "symmetric" bilinear map as described above (the "symmetric-map key exchange scheme") or an "asymmetric" bilinear map as will be described later (the "asymmetric-map key exchange scheme"). The IBE encryption scheme may similarly be implemented using a symmetric bilinear map (the "symmetric-map IBE encryption scheme") or an asymmetric bilinear map (the "asymmetric-map IBE encryption scheme").

Bilinear maps are equivalently referred to as bilinear pairings or bilinear mappings.

Any suitable groups and pairings may be used in the IBE schemes of the present invention.

For example, consider a symmetric bilinear pairing construction that is based on groups G and V with a bilinear pairing e: G×G→V. In this illustrative construction, a large prime p is chosen of at least 160 bits and a random integer r is chosen such that q=12 r p−1 is a prime of at least 512 bits. Consider the elliptic curve given by the equation EC: $y^2 = x^3 + 1$ (mod q). Take G to be the subgroup of order p of the group EC(GF(q)) of points with coordinates (x,y) satisfying the curve equation in the Galois field GF(q), where EC(GF(q)) also includes the point at infinity. Let V be the subgroup of order p of the Galois field $GF(q^2)$. Denote by Wf the Weil pairing on the curve EC, which is a function Wf: G×EC(GF$(q^2)$)→GF$(q^2)$. (The Tate pairing is another suitable candidate for Wf, and is sometimes more efficient.) Let the "distortion" function Df: EC(GF(q))→EC(GF$(q^2)$) map any point of coordinates (x,y) to the point of coordinates (Z x, y) where the constant Z is a fixed non-trivial cubic root of 1 in GF$(q^2)$. Then, a suitable pairing e: G×G→V is obtained by taking e(A,B)=Wf(A,C) where C=Df(B), for any input points A and B in G.

Examples of asymmetric-map schemes include those based on the Tate or Weil pairing (which do not need to use the distortion map Df).

Figure 2:
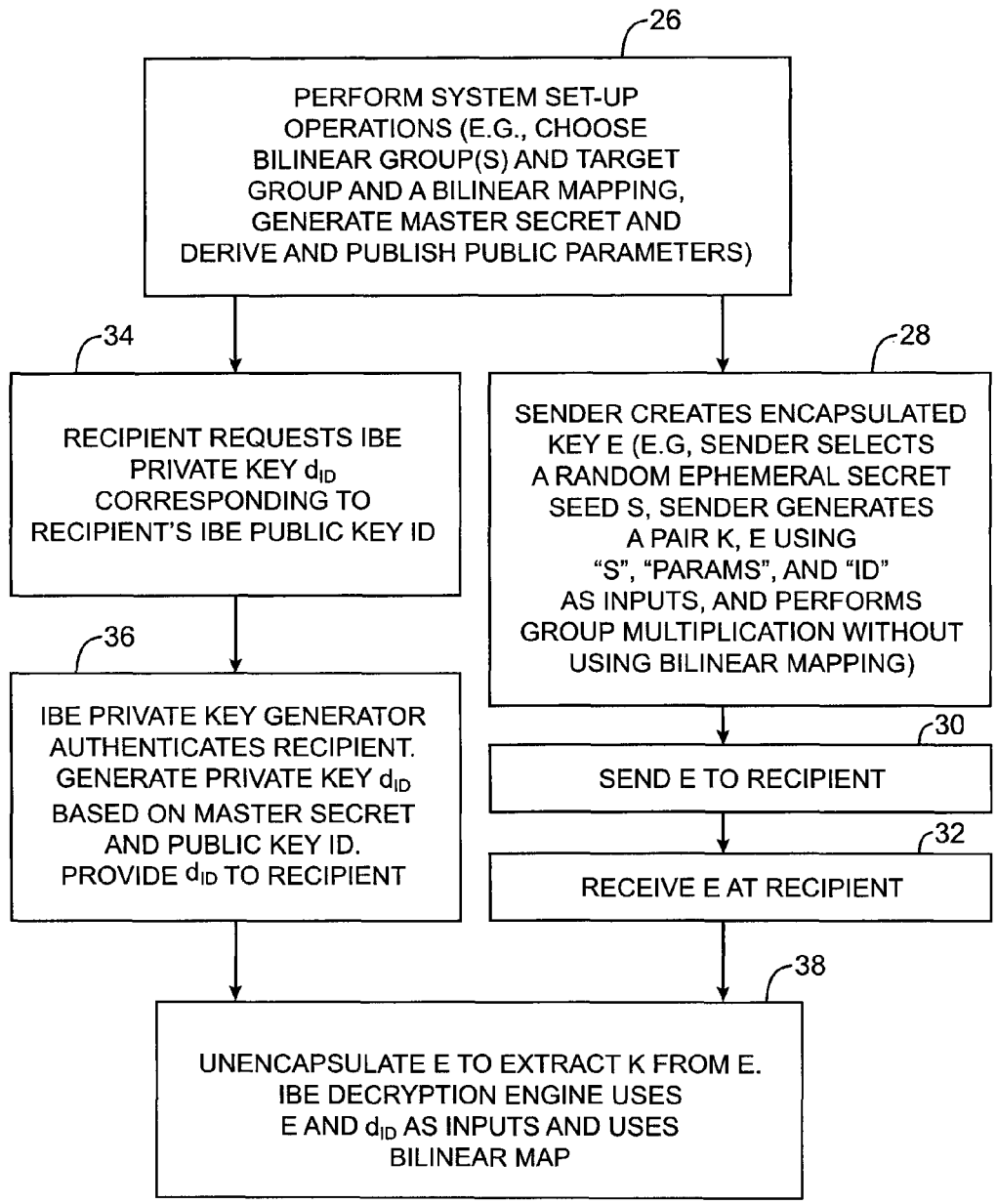
FIG. 2 is a flow chart of illustrative steps involved in using a key exchange process to securely exchange a key between a sender and a recipient in accordance with the present invention.

A flow chart of illustrative steps involved in using system 10 to implement the symmetric-map and asymmetric-map key exchange schemes is shown in FIG. 2.

At step 26, the key generator 22 is used to perform system set-up operations. During system setup, system inputs are gathered from appropriate personnel such as a system administrator. For example, the system administrator may choose a bilinear group G or bilinear groups G and G' and may choose a target group V. An appropriate symmetric bilinear mapping e or asymmetric bilinear mapping e' is also selected. These selections are provided to the key generator 22.

During setup step 26, the private key generator 22 generates or otherwise obtains a master secret. For example, private key generator 22 may create a master secret from a number that is randomly generated at the private key generator by a processor housed inside a tamper-proof enclosure. The master secret may also be produced off-site and delivered to the private key generator 22.

The master secret (also sometimes referred to as a secret master key or "master-key") is secret information that is used by the IBE key generator 22 to generate IBE private keys. The IBE key generator 22 also uses the master secret in generating the IBE public parameters "params." During the setup operations of step 26, the IBE public parameters that are generated are published. With one suitable arrangement, the IBE key generator 22 provides the IBE public parameters to a host server 24 that a sender can reach using an associated domain name or other suitable service name that is generated based on the recipient's public key (e.g., using a known service-name generation rule). These are merely illustrative techniques for making the public parameter information available to users in system 10. Any suitable technique for making the public parameter information available to the users may be used if desired.

At step 28, the sender uses IBE encryption engine 14, which is serving as an encapsulation engine, to create an encapsulated key E. With one suitable approach, the sender selects a random ephemeral secret seed s. After selecting s, the sender generates the pair K, E using the seed s, the public parameters params, and the public key ID as inputs. A copy of key K is retained by the sender. In generating K, E, engine 14 performs group multiplications and exponentiations (which may be viewed as and are implemented using a sequence of group multiplications), but does not make any bilinear mapping calculations. Group multiplication and exponentiation encryption operations can generally be performed much more rapidly than bilinear map encryption operations, so performing the calculations of step 28 without using a bilinear map enhances encryption (encapsulation) efficiency. In particular, all group exponentiations performed in the calculations of step 28 involve exponentiating fixed bases (the g parameters in the equations) that depend only on the IBE public parameters. Such exponentiation calculations can be greatly accelerated by performing pre-computations once and for all upon receipt of the public parameters, caching the results of such precomputations, and using these pre-computation results when performing the calculations of step 28.

At step 30, the sender sends the encapsulated key E to the recipient (e.g., over network 16). The encapsulated key E can only be unencapsulated by a recipient having a valid IBE private key corresponding to the public key ID used by engine 14 during the encapsulation process of step 28. Accordingly, transmission of E to the recipient at step 30 is secure.

The recipient receives the transmitted encapsulated key E at step 32.

At step 34, independent of the encryption/encapsulation process of step 28, the recipient requests the recipient IBE private key $d_{ID}$ corresponding to the recipient's IBE public key ID. The recipient may make the request to IBE private key generator 22 electronically over network 16. The key request process of step 34 may take place before the operations of step 28 or after the operations of step 28. During the key request process, the recipient informs the IBE private key generator 22 of which IBE private key is desired (e.g., by providing the IBE private key generator 22 with the IBE public key ID as part of the key request). The recipient also provides the IBE private key generator 22 with recipient credentials. Any suitable credentials may be used by the recipient to establish that the recipient is authorized to receive the IBE private key $d_{ID}$. For example, the recipient may provide the IBE private key generator with username and password information, credentials based on biometric information, or any other suitable credentials.

At step 36, the IBE key generator 22 authenticates the recipient's credentials to verify that the recipient is authorized to receive a copy of the private key $d_{ID}$. If the IBE key generator 22 determines that the recipient's request is valid, the IBE key generator 22 generates the IBE private key $d_{ID}$ corresponding to the recipient's IBE public key ID and securely delivers the private key $d_{ID}$ to the recipient (e.g., over a secure communications path in network 16). The recipient may cache the IBE private key for future use. If the IBE private key is cached, the recipient will typically only need to request a new IBE private key when the old key expires.

At step 38, the recipient has received the IBE private key $d_{ID}$ and the encapsulated key E and uses IBE decryption engine 20, which is serving as an unencapsulation engine to unencapsulate (decrypt) E. Engine 20 uses both E and $d_{ID}$ as inputs and performs unencapsulation (decryption) operations using the bilinear map established during setup. By unencapsulating E, engine 20 extracts the secret key K from E. This completes the key exchange process, as both the sender and recipient have securely obtained copies of the same key K. The key K may be used for any suitable application (e.g., encrypting data to send over network 16, authenticating data received over network 16, etc.).

Figure 3:
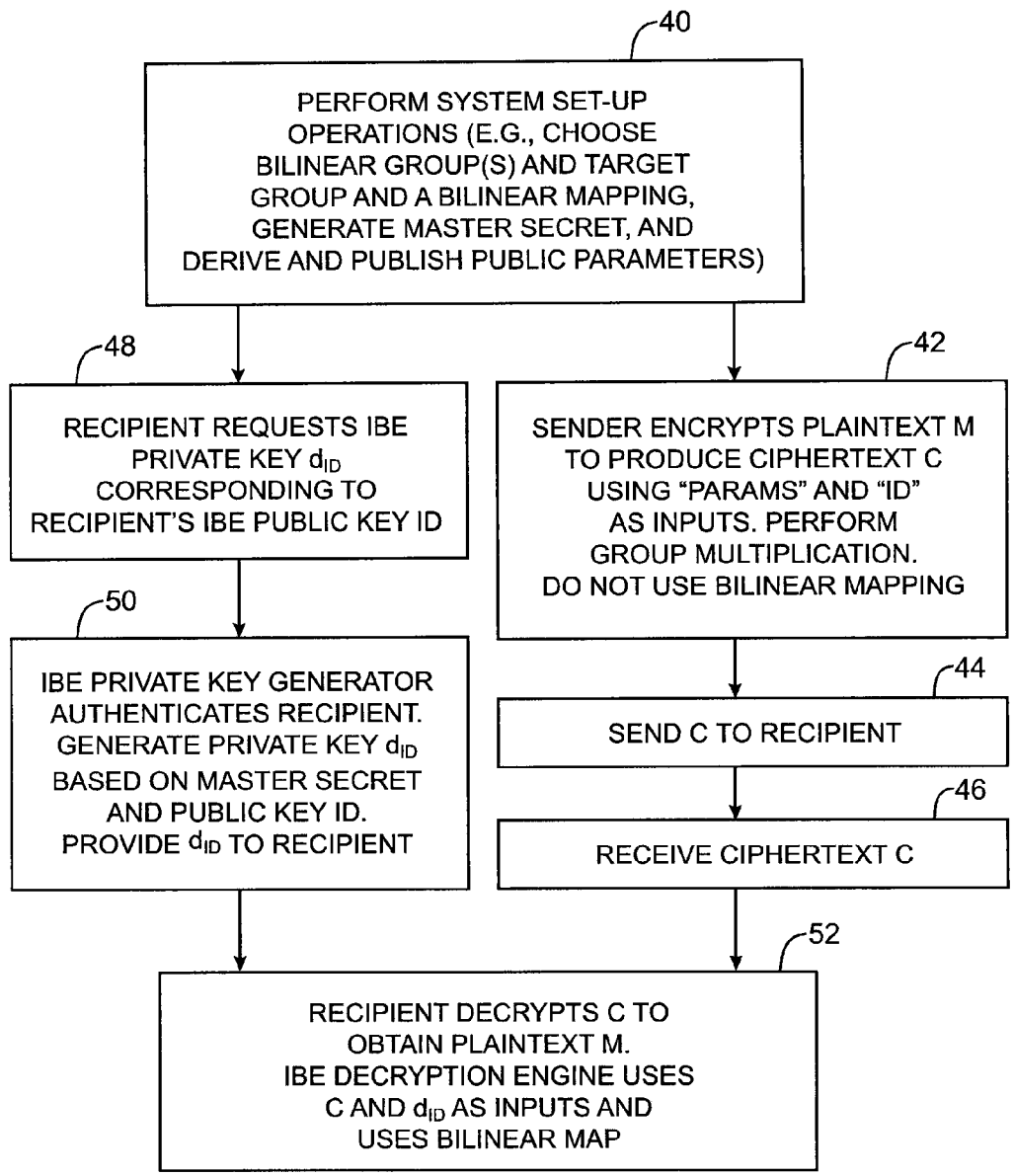
FIG. 3 is a flow chart of illustrative steps involved in using an IBE process to perform encryption and decryption operations in accordance with the present invention.

A flow chart of illustrative steps involved in using system 10 to implement the symmetric-map and asymmetric-map IBE encryption schemes is shown in FIG. 3.

At step 40, the key generator 22 is used to perform system set-up operations. During system setup, system inputs are gathered from appropriate personnel such as a system administrator. For example, the system administrator may choose a bilinear group G or bilinear groups G and G' and may choose a target group V, as described in connection with the key exchange process of FIG. 2. An appropriate symmetric bilinear map e or asymmetric bilinear map e' is also selected during setup step 40. These selections are provided to the key generator 22.

During setup operations at step 40, the private key generator 22 generates or otherwise obtains a master secret (called master-key). The IBE key generator 22 uses the master secret to generating the IBE public parameters "params" and publishes the IBE public parameters as described in connection with setup step 26 of FIG. 2. The IBE key generator 22 may, for example, provide params to host server 24 (FIG. 1) so that a sender can access params over communications network 16 using a domain name or other service name generated from the recipient's public key ID using a service name generation rule. Other suitable technique for making the public parameter information publicly available may be used if desired.

At step 42, the sender uses IBE encryption engine 14 to encrypt plaintext M. In encrypting plaintext M, the engine 14 produces ciphertext C. The public parameters params and the public key ID of a desired recipient of the plaintext are used as inputs to the IBE encryption engine. In accordance with the present invention, encryption is performed efficiently using group multiplication operations without using bilinear mappings.

At step 44, the sender sends the ciphertext C to the recipient. For example, the sender can convey ciphertext C to the recipient electronically over network 16 (e.g., in an email message or other electronic communication). The ciphertext C cannot be decrypted without the IBE private key $d_{ID}$ corresponding to the public key ID, so the contents of the ciphertext C is secure during transmission.

At step 46, the recipient receives the transmitted ciphertext C.

At step 48, independent of the encryption process of step 42, the recipient requests the recipient's IBE private key $d_{ID}$ corresponding to the recipient's IBE public key ID. The recipient may make the request to IBE private key generator 22 electronically over network 16. The key request process of step 48 may take place before the encryption operations of step 42 or after the encryption operations of step 42. During the key request process, the recipient informs the IBE private key generator 22 of which IBE private key is desired (e.g., by providing the IBE private key generator 22 with the IBE public key ID as part of the key request). The recipient also provides the IBE private key generator 22 with suitable recipient credentials, as described in connection with step 34 of FIG. 2.

At step 50, the IBE key generator 22 authenticates the recipient's credentials to verify that the recipient is authorized to receive a copy of the private key $d_{ID}$. If the IBE key generator 22 determines that the recipient's request is valid, the IBE key generator 22 generates the IBE private key $d_{ID}$ corresponding to the recipient's IBE public key ID and securely delivers the private key $d_{ID}$ to the recipient (e.g., over a secure communications path in network 16). The recipient can cache the private key $d_{ID}$ to use in subsequent decryption operations.

At step 52, the recipient has received the IBE private key $d_{ID}$ (or has retrieved a previously stored copy) and has received the ciphertext C and uses IBE decryption engine 20 to decrypt C. Engine 20 uses both C and $d_{ID}$ as inputs and performs decryption operations using the bilinear map established during setup. The output of the decryption engine 20 is the plaintext M.

The flow chart of FIG. 2 shows steps involved in using system 10 (FIG. 1) to implement symmetric-map and asymmetric-map IBE key exchange schemes. These key exchange schemes may be implemented using suitable functions. In particular, the key exchange schemes may be implemented using a setup function called setup at step 26, a key generation function called keygen at step 36, an encapsulation function called encapsulate at step 28, and an unencapsulation function called unencapsulate at step 38.

The flow chart of FIG. 3 shows steps involved in using system 10 (FIG. 1) to implement symmetric-map and asymmetric-map IBE encryption schemes. These IBE encryption schemes may be implemented using functions setup, keygen, encrypt, and decrypt. With one suitable arrangement, the IBE encryption schemes may be implemented using a setup function called setup at step 40, a key generation function called keygen at step 50, an encryption function called encrypt at step 42, and a decryption function called decrypt at step 46.

Operations performed by the functions setup, keygen, encapsulate, and unencapsulate in the symmetric-map IBE key exchange scheme are described in connection with equations 1-6.

During use of the symmetric-map IBE key exchange function setup at step 26 of FIG. 2, system parameters are generated for the IBE encryption engine 14. In the context of the symmetric-map IBE key exchange scheme, the IBE encryption engine 14 serves as an IBE encapsulation engine. To generate system parameters, a random $\alpha$ in $Z_p$ is selected by function setup. The value $g_1$ is set to $g^\alpha$. Two random elements $g_2$, $g_3$ in G are selected. The function setup computes $g_0 = g_2^\alpha$ and $v = e(g_1, g_2)$. The public parameters "params" are computed by setup as the tuple of four elements given by equation 1.

$$params=(g,g1,g3,v) \qquad (1)$$

The master secret master-key is computed using equation 2.

$$master\text{-}key=g_0 \qquad (2)$$

Notice that $g_2$ may be substituted for v in the public parameters, in which case the value of v may be recomputed locally by the user of the public parameters as $v=e(g_1, g_2)$.

During use of the symmetric-map IBE key exchange function keygen at step 36 of FIG. 2, the a private key $d_{ID}$ is generated corresponding to IBE public key ID. To generate the private key $d_{ID}$ for the identity $ID\epsilon\{0,1\}^*$, a random $r\epsilon Z_p$ is selected. The function keygen then computes $d_{ID}$ using equation 3.

$$d_{ID}=(g_0g_3^r g_1^{H(ID)r},g^r) \qquad (3)$$

During use of the symmetric-map IBE key exchange function encapsulate(params, ID) at step 28 of FIG. 2, the encapsulated key is generated by the IBE encapsulation (encryption) engine 14. Function encapsulate creates the encapsulated key E and the associated secret key K$\epsilon$V under the public key ID in $\{0,1\}^*$ by picking a random $s\epsilon Z_p$ and by computing E using equation 4 and K using equation 5.

$$E=(c_0=g^s, c_1=g_3^s g_1^{H(ID)s}) \qquad (4)$$

$$K=v^s \qquad (5)$$

Note that in equations 4 and 5 (and the other encryption and encapsulation equations described herein), the bases (the "g" values) remain fixed from one encryption (or encapsulation) operation to the next. Although the exponent(s) may vary from one encryption (or encapsulation) to the next, the bases (here, g, $g_1$, $g_3$, and v) are fixed and remain invariant under a given set of IBE public parameters. Because exponentiation operations used by the IBE encryption engine 14 are performed on fixed bases that depend solely on the IBE public parameters, the encapsulation and encryption operations of the present invention can be made more efficient than would otherwise be possible.

During use of the symmetric-map IBE key exchange function unencapsulate($d_{ID}$, E) at step 38 of FIG. 2, unencapsulation (which is a form of decryption) is performed using a private key corresponding to an identity $ID\epsilon\{0,1\}^*$. The encapsulated key $E=(c_0, c_1)$ is unencapsulated (decrypted) using private key $d_{ID}=(d_0, d_1)$ by parsing E to produced $c_0$ and $c_1$ and computing K using equation 6.

$$K=e(c_0, d_0)/e(c_1, d_1) \qquad (6)$$

Note that the unencapsulation process in equation 6 uses the bilinear map e, but that the encapsulation process of equation 4 uses only group multiplication and group exponentiation (which reduces to and is implemented as a sequence of group multiplications).

Operations performed by the functions setup, keygen, encrypt, and decrypt in the symmetric-map IBE encryption scheme are described in connection with equations 7-11. The symbol $\oplus$ denotes the bitwise XOR operator (exclusive OR).

During use of the symmetric-map IBE encryption function setup at step 40 of FIG. 3, system parameters are generated for the IBE encryption engine 14. To generate system parameters for IBE encryption engine 14, a random $\alpha$ in $Z_p$ is selected. The value $g_1$ is set to $g^\alpha$. Two random elements $g_2$, $g_3$ in G are selected. The function setup computes $g_0=g_2^\alpha$ and $v=e(g_1, g_2)$. The public parameters "params" are computed using equation 7.

$$params=(g,g1,g3,v) \qquad (7)$$

The master secret master-key is computed using equation 8.

$$master\text{-}key=g_0 \qquad (8)$$

During use of the symmetric-map IBE encryption function keygen[master-key, ID] at step 50 of FIG. 3, a private key $d_{ID}$ is generated corresponding to IBE public key ID. To generate the private key $d_{ID}$ for the identity $ID\epsilon\{0,1\}$, a random $r\epsilon Z_p$ is selected by the keygen function. The function keygen then computes $d_{ID}$ using equation 9.

$$d_{ID}=(g_0g_3^r g_1^{H(ID)r},g^r) \qquad (9)$$

During use of the symmetric-map IBE encryption function encrypt(params, ID, M) at step 42 of FIG. 3, plaintext $M\epsilon\{0,1\}^1$ is encrypted under the public key $ID\epsilon\{0,1\}^*$. The function encrypt is used to select a random $s\epsilon Z_p$. The ciphertext C is computed using equation 10.

$$C=[c=M\oplus H'(v^s), c_0=g^s, c_1=g_3^s g_1^{H(ID)s}] \qquad (10)$$

During use of the symmetric-map IBE encryption function decrypt($d_{ID}$, C) at step 44 of FIG. 3, decryption operations are performed using a private key corresponding to a public key $ID\epsilon\{0,1\}^*$. The ciphertext $C=(c, c_0, c_1)$ is decrypted by using $d_0$ and $d_1$ of private key $d_{ID}=(d_0, d_1)$ to compute plaintext M according to equation 11.

$$M=c\oplus H'[e(c_0, d_0)/e(c_1, d_1)] \qquad (11)$$

The security of the symmetric-map key exchange scheme is based on the decisional BDH assumption. Security in the symmetric-map IBE encryption scheme is based on the weaker computational BDH assumption when H' is viewed as a random oracle. If H' is not modeled as a random oracle, then the IBE symmetric-map encryption scheme will be secure under the decisional BDH assumption.

If desired, asymmetric bilinear pairings and groups may be used in place of symmetric bilinear pairings and groups. Some bilinear pairings are more efficient when implemented using an asymmetric variant of the pairing. A well-known example of this phenomenon is the realization of bilinear pairings on a class of elliptic curves known as MNT curves.

We say that a symmetric pairing is a bilinear pairing e: $G\times G\to V$ defined over some group G. We say that an asymmetric pairing is a bilinear map e': $G\times G'\to V$ defined over a pair of groups (G, G') where G and G' are cyclic groups of the same order p, with respective generators $g\epsilon G$ and $g'\epsilon G'$ and related by a group isomorphism $\Phi$: $G'\to G$ such that $\Phi(g')=g$. In the asymmetric case, we require that either $\Phi$ or its inverse $\Phi^{-1}$ be efficiently computable.

Symmetric and asymmetric pairings are related. On the one hand, a symmetric pairing in G can be rewritten as an asymmetric pairing in (G, G'), where G=G', g=g' and $\Phi=\Phi^{-1}$ is the identity function. Conversely, one can construct a symmetric pairing given an asymmetric pairing e' provided that one of the functions $\Phi$ or $\Phi^{-1}$ is efficiently computable: if $\Phi$ is efficiently computable, then define the symmetric pairing e: $G'\times G'\to V$ in the group G' as $e(x,y)=e'(\Phi(x),y)$; if instead $\Phi^{-1}$ is efficiently computable, then define e: $G\times G\to V$ as $e(x,y)=e'(x, \Phi^{-1}(y))$.

A benefit of the asymmetric pairing approach is that in some mathematical realizations of asymmetric pairings the elements of, say, G afford a much smaller representation than the elements of G', and the only known efficiently computable isomorphisms are in the direction from G' to G. As a result, one cannot construct a symmetric pairing with such compactly represented elements. An example of this is the case where e' is realized as the Weil or Tate pairing on a class of elliptic curves of low embedding degree, known as MNT curves. In this case, one chooses G for the group of points of order p with coordinates in the base field and G' as the group of points in the extension field. This results in elements in G having the smaller representation. In this case there exists a simple and efficiently computable isomorphism Φ: G' to G given by the trace map defined from the Frobenius endomorphism, but no isomorphism is known to be efficiently computable in the reverse direction.

The computational and decisional BDH assumptions discussed above can be restated in the context of bilinear groups with asymmetric pairings, where they are known as the co-BDH assumptions.

In the asymmetric-map IBE key exchange scheme and asymmetric-map IBE encryption scheme, the keygen function selects its random elements from G' and their images under Φ in G. The keygen function also uses elements from G' for private key generation purposes. The IBE encryption (encapsulation) engine uses only elements from G and V for encryption (encapsulation) purposes. In the functions of the asymmetric-map IBE key exchange scheme and asymmetric-map IBE encryption scheme the asymmetric pairing e' takes the place of symmetric map e in the functions of the symmetric-map IBE key exchange scheme and symmetric-map IBE encryption scheme.

In the asymmetric-map versions of the IBE key exchange and IBE encryption schemes, (G, G') are a pair of bilinear groups of order p with an efficiently computable, non-degenerate bilinear map e': G×G'→V, and an efficiently computable group isomorphism Φ: G'→G. The variables g and g' represent generators of G and G' respectively, where g=Φ(g'). The hash function H: $\{0,1\}^*$ to $Z_p$ is a cryptographic hash function viewed as a random oracle.

Operations performed by the functions setup, keygen, encapsulate, and unencapsulate in the asymmetric-map IBE key exchange scheme are described in connection with equations 12-23.

During use of the asymmetric-map IBE key exchange function setup at step 26 of FIG. 2, random values are selected for α, β, and γ in $Z_p$. Values are computed for $g_1$, $g_1'$, $g_3$, $g_3'$, $g_0$, and v using equations 12, 13, 14, 15, 16, and 17.

$$g_1 = g^\alpha \tag{12}$$

$$g_1' = (g')^\alpha \tag{13}$$

$$g_3 = g^\gamma \tag{14}$$

$$g_3' = (g')^\gamma \tag{15}$$

$$g_0' = (g')^{\alpha\beta} \tag{16}$$

$$v = e'(g,g')^{\alpha\beta} \tag{17}$$

The function setup is then used to compute the public parameters params and the master secret master-key according to equations 18 and 19.

$$\text{params} = (g, g_1, g_3, \text{ and } v) \in G^3 \times V \tag{18}$$

$$\text{master-key} = g_0' \in G' \tag{19}$$

The key generator 22 retains g', $g_1'$, and $g_3'$ for use in the private key generation process (function keygen). These parameters need not be kept secret and are thus not included in master-key.

During use of the asymmetric-map IBE key exchange function keygen at step 36 of FIG. 2, a private key $d_{ID}$ is generated for an ID∈$\{0,1\}^*$. The function keygen selects a random r∈$Z_p$ and computes $d_{ID}$ using equation 20.

$$d_{ID} = [g_0'(g_3')^r(g_1')^{H(ID)r}, (g')^r] \in (G')^2 \tag{20}$$

During use of the asymmetric-map IBE key exchange function encapsulate at step 28 of FIG. 2, the encapsulated key E and the corresponding secret key K are generated for the public key ID∈$\{0,1\}^*$. The function encapsulate selects a random s∈$Z_p$ and computes E using equation 21.

$$E = [c_0 = g^s, c_1 = g_3^s g_1^{H(ID)s}] \in G^2. \tag{21}$$

The function encapsulate computes the value for the secret key K using equation 22.

$$K = v^s \text{ in } V \tag{22}$$

The value of K that is computed using equation 22 is retained at the sender.

During use of the asymmetric-map IBE key exchange function unencapsulate($d_{ID}$, E) by the recipient at step 38 of FIG. 2, the secret key K is recovered from E. The unencapsulate function unencapsulates (decrypts) encapsulated key E=($c_0$, $c_1$) using the private key $d_{ID}$=($d_0$, $d_1$). The unencapsulate function extracts K from E using equation 23.

$$K = [e'(c_0, d_0)/e'(c_1, d_1)] \in V \tag{23}$$

Operations performed by the functions setup, keygen, encrypt, and decrypt in the asymmetric-map IBE encryption scheme are described in connection with equations 24-34.

During use of the asymmetric-map IBE encryption function setup at step 40 of FIG. 3, random values are selected for α, β, and γ in $Z_p$. Values are computed for $g_1$, $g_1'$, $g_3$, $g_3'$, $g_0$, and v using equations 24, 25, 26, 27, 28, and 29.

$$g_1 = g^\alpha \tag{24}$$

$$g_1' = (g')^\alpha \tag{25}$$

$$g_3 = g^\gamma \tag{26}$$

$$g_3' = (g')^\gamma \tag{27}$$

$$g_0' = (g')^{\alpha\beta} \tag{28}$$

$$v = e'(g,g')^{\alpha\beta} \tag{29}$$

The function setup is then used to compute the public parameters params and the master secret master-key according to equations 30 and 31.

$$\text{params} = (g, g_1, g_3, \text{ and } v) \in G^3 \times V \tag{30}$$

$$\text{master-key} = g_0' \in G' \tag{31}$$

The key generator 22 retains g', $g_1'$, and $g_3'$ for use in the private key generation process (function keygen). These parameters need not be kept secret and are thus not included in master-key.

During use of the asymmetric-map IBE encryption function keygen[master-key, ID] at step 50 of FIG. 3, a private key $d_{ID}$ is generated for an ID∈$\{0,1\}^*$. The function keygen selects a random r∈$Z_p$ and computes $d_{ID}$ using equation 32.

$$d_{ID} = [g_0'(g_3')^r(g_1')^{H(ID)r}, (g')^r] \in (G')^2 \tag{32}$$

During use of the asymmetric-map IBE encryption function encrypt(params, ID, M) at step 42 of FIG. 3, the plaintext M in $\{0,1\}^1$ is encrypted under the public key ID in $\{0,1\}^*$. The function encrypt is used to select a random s∈$Z_p$. The function encrypt generates the ciphertext C using equation 33.

$$C = [c = M \oplus H'(v^s), c_1 = g^s, c_2 = g_3^s g_1^{H(ID)s}]$$

$$\in V \times G \times G \tag{33}$$

During use of the asymmetric-map IBE encryption function decrypt($d_{ID}$, C) at step 44 of FIG. 3, the recipient uses engine 20 to decrypt the ciphertext C=(c, $c_0$, $c_1$) using the private key $d_{ID}$=($d_0$, $d_1$). In performing decryption, the function decrypt parses C into c, $c_0$, and $c_1$ and parses $d_{ID}$ into $d_0$ and $d_1$, then computes M using equation 34.

$$M = C \oplus H[e'(c_0, d_0)/e'(c_1, d_1)] \in \{0,1\}^l \quad (34)$$

Figure 4:
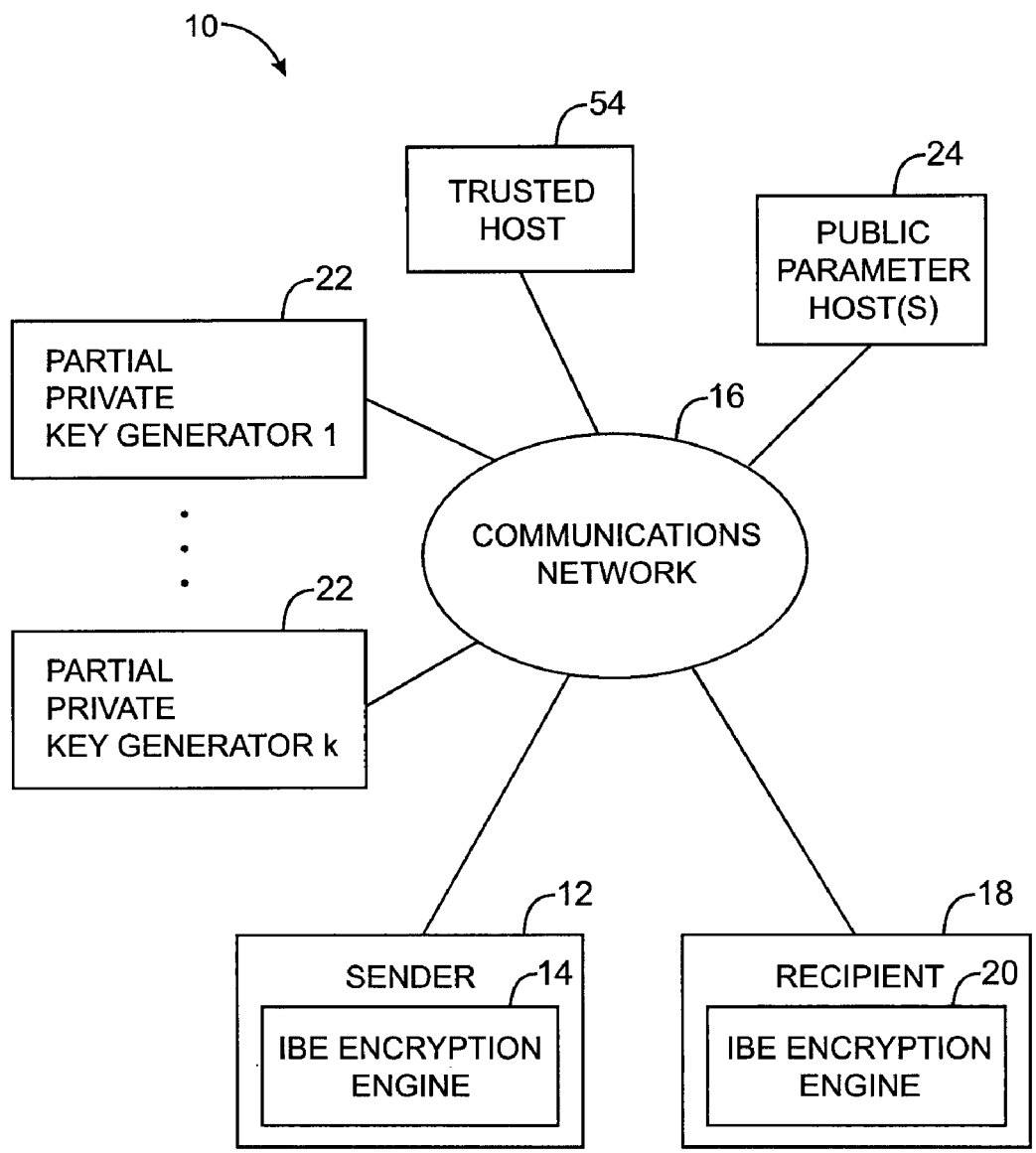
FIG. 4 is a diagram of an illustrative distributed key IBE cryptosystem in accordance with the present invention.

In typical deployments of the system 10 of FIG. 1 (in both symmetric-map and asymmetric-map schemes and for both key exchange and IBE encryption), the master-key held by the private key generator 22 must be well protected. If the master-key is compromised, security in the entire system 10 will be compromised. If desired, the master-key can be distributed among a number of partial private key generators (PPKGs) located at different sites, using threshold cryptographic techniques. A system 10 having multiple separate partial private key generators 22 (i.e., k partial private key generators 1 to k) is shown in FIG. 4. With one suitable arrangement, a k-out-of-n threshold scheme is used. With this type of approach, the master-key is divided into n shares, such that any k of the n shares are necessary to reconstitute the master-key or, in our example, generate respective private key shares from which a usable private key can be reconstituted.

When a partial private key generator architecture is used, the functions setup and keygen are different than in a unitary-key-generator architecture. During setup, the public parameters and the master key depend on a randomly chosen integer $\alpha \in Z_p$, whose only appearances are as an exponent in the definitions of $g_1 = g^\alpha$ and master-key=$g_0 = g_2^\alpha$. Using Shamir's k-out-of-n secret sharing scheme for modular integers, $\alpha$ may be split into n secret shares $\alpha_1, \ldots \alpha_n$ in $Z_p$, along with some public information $\Lambda$, such that for any k distinct indices $i_1, \ldots i_k$ we have $\Sigma \lambda_{ij} \alpha_{ij} = \alpha$ (where j ranges from 1 to k) for appropriate Lagrange coefficients $\lambda_{i1}, \ldots, \lambda_{ik} \in Z_p$ which are publicly computable from $\Lambda$. In our IBE system, this gives us a way to implement a distributed key generation scheme—along with, at the recipient side, a method to reconstruct a full private key $d_{ID}$ given at least k shares $d_{ID-1}, \ldots, d_{ID-k}$ thereof, generated by k different partial private key generators 22.

Distributed key arrangements can be used in the context of symmetric map and asymmetric map systems. An illustrative symmetric map implementation of a distributed key generation IBE system is described as an example. In this example, a distributed system is constructed having n partial private key generators 22 that can only generate partial shares of a recipient's private key, such that any k of the partial shares are needed to reconstitute the recipient's full private key.

The master secret and corresponding IBE public parameters can be generated using a centralized generation scheme or a distributed generation scheme.

With a centralized generation approach, a trusted host 54 (FIG. 4) generates the IBE public parameters. The host 54 uses a setup function to select a random $\alpha \in Z_p$, sets $g_1 = g^\alpha$, and selects two random elements $g_2, g_3 \in G$. Using Shamir's scheme, the trusted host then splits $\alpha$ into n secret shares $\alpha_1, \ldots \alpha_n \in Z_p$ and some common information $\Lambda$, as described above. The host then computes $v = e(g_1, g_2)$ and $g_{0,i} = g^{\alpha i}$ where the index i of $\alpha_i$ in the exponent ranges from 1 to n. The public parameters params and the shares master-key$_1$, . . . , master-key$_n$ of the master secret are then computed using equations 35 and 36.

$$\text{params} = (\Lambda, g, g_1, g_3, v) \quad (35)$$

$$\text{master-key}_i = g_{0,i} \text{ for } i=1, \ldots, n \quad (36)$$

The public parameters params are published by the trusted host 54 (e.g., on one or more public parameter hosts 24). Each partial private key generator i, for i=1, . . . , n is also provided with its share master-key$_i$ of the master secret. Once this has been accomplished, all non-public information is preferably expunged from the trusted host 54 (including $\alpha$, the $\alpha_i$, and the $g_{0,i}$) to enhance security.

With the distributed generation approach, the partial private key generators 22 collaborate to perform multi-party computations. This collaboration results in each partial private key generator obtaining a respective master-key share and each partial private key generator obtaining the public parameters params (which it publishes using a single public parameter host 24, multiple hosts 24, or other suitable distribution arrangement).

In generating the partial private keys $(d_{ID})_i$, for an identity $ID \in \{0,1\}^*$, each partial private key generator i selects a random $r_i \in Z_p$ and computes a $(d_{ID})_i$ using equation 37.

$$(d_{ID})_i = (g_{0,i} g_3^{r*i} g_1^{H(ID)*r*i}, g^{r*i}) = (d_{0,i}, d_{1,i}) \quad (37)$$

A recipient can reconstruct the recipient's full private key $d_{ID}$ from k valid partial private keys $(d_{ID})_{ij} = (d_{0,ij}, d_{1,ij})$ for j=1, . . . , k using equation 38.

$$d_{ID} = [d_0 = \Pi(d_{0,ij})^{\lambda ij}, d_1 = \Pi(d_{1,ij})^{\lambda ij}] \quad (38)$$

In equation 38, the products are taken over all j from 1 to k. The terms $\lambda_{ij}$ for j=1, . . . , k are the appropriate Lagrange coefficients for the k chosen shares $g_{0,ij}$, as derived from the public sharing information $\Lambda$. Observe that $d_{ID} = [g_2^\alpha g_1^{H(ID)r} g_3^r, g^r]$, where $r = \Sigma \lambda_{ij} r_{ij}$ from j=1 to k is random $\in Z_p$, so that $d_{ID}$ is a valid private key for ID.

The encrypt (encapsulate) and decrypt (unencapsulate) functions operate the same, regardless of the key distribution mechanism. Accordingly, the functions encrypt (encapsulate) and decrypt (unencapsulate) for the system 10 of FIG. 4 operate as described in connection with system 10 of FIG. 1.

Figure 5:
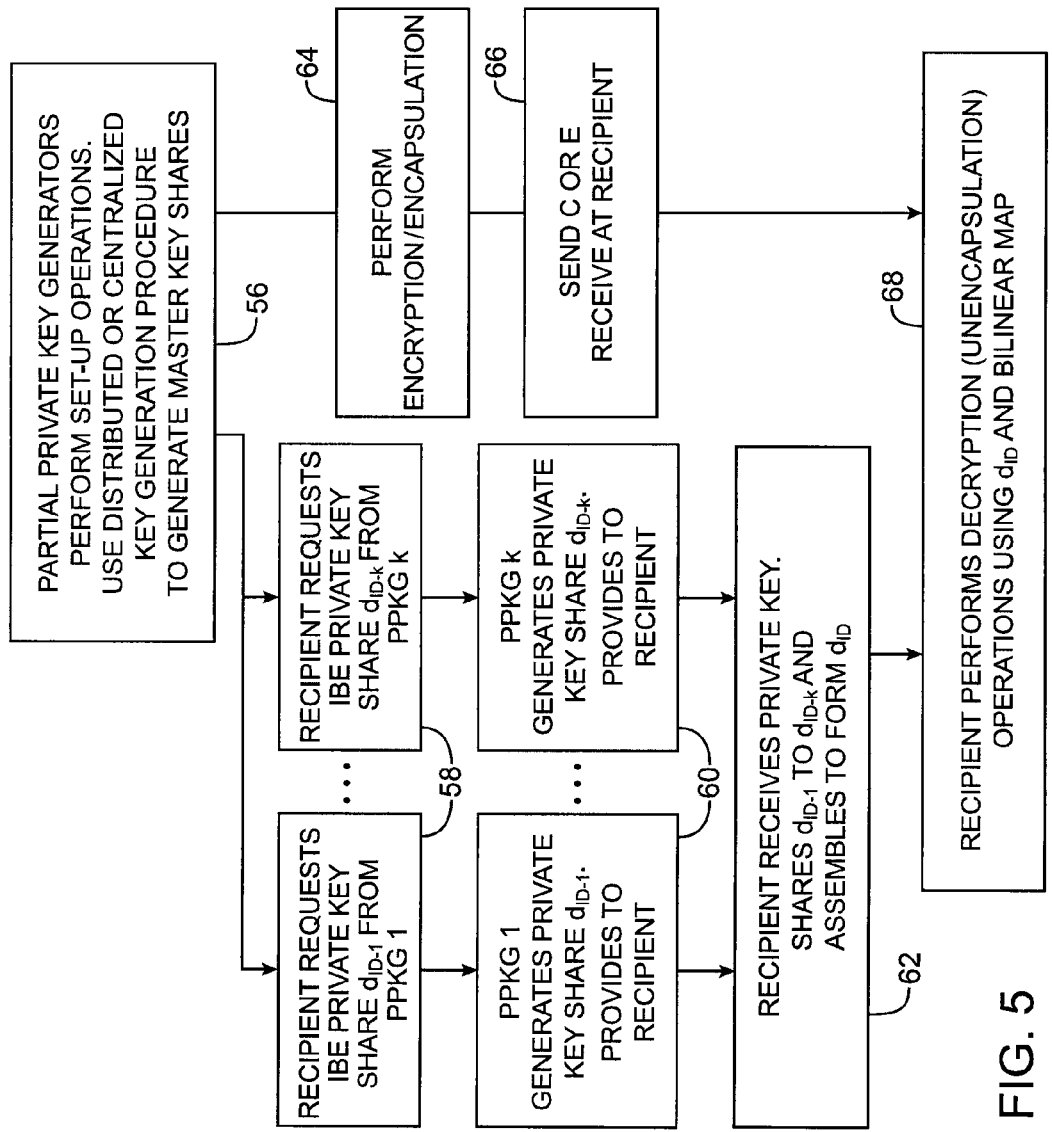
FIG. 5 is a flow chart of illustrative steps involved in using the distributed key IBE cryptosystem of FIG. 4 in accordance with the present invention.

Illustrative steps involved in using a distributed key arrangement to perform both IBE key exchange operations (such as those described in connection with FIG. 2) and IBE encryption operations (such as those described in connection with FIG. 3) are shown in FIG. 5.

At step 56, the partial private key generators 22 (and optionally trusted host 54) are used to perform setup operations. Either a centralized or a distributed key generation approach may be used to generate master secret shares. The master secret shares are each provided to a respective partial private key generators 22 (FIG. 4).

During steps 64 and 66, a sender encrypts plaintext M and conveys corresponding ciphertext C to a recipient or the sender generates an encapsulated key E and conveys E to the recipient, as described in connection with steps 28, 30, and 32 of FIG. 2 and steps 42, 44, and 46 of FIG. 3. These steps are independent of the key request and key generation steps in FIG. 5.

As shown by steps 58 in FIG. 5, the recipient forms multiple IBE private key share requests. For example, the recipient requests IBE private key share $d_{ID-1}$ from partial private key generator 1, requests IBE private key share $d_{ID-2}$ from partial private key generator 2, etc. Each partial private key generator authenticates the recipient.

At steps 60, each partial private key generator 22 generates the requested private key share $d_{ID-1}$, $d_{ID-2}$, etc., as shown in FIG. 5.

At step 62, the recipient gathers the private key shares $d_{ID-1}$ to $d_{ID-k}$ from the respective partial private key generators 22 and assembles the private key shares into a full private key $d_{ID}$, as described in connection with equation 38. The recipient can cache the private key so that subsequent decryption/decapsulation operations can be performed without making key requests to the partial private key generators.

At step 68, the recipient uses the assembled private key $d_{ID}$ to perform decryption or unencapsulation operations.

In the IBE schemes described above, the encryption and encapsulation operations are preferably performed without making bilinear mapping calculations. A bilinear map is preferably used in calculating the IBE public parameters. The result of these bilinear map computations (the parameter v in the equations) is used as a base in group exponentiation operations performed during encryption and encapsulation operations. Because v and the other bases ($g$, $g_1$, and $g_3$) used in encryption and encapsulation operations are fixed for any given set of IBE public parameters (i.e., the bases are invariant with respect to the IBE public key and the randomization s), group exponentiation operations during encryption and encapsulation can be made efficient by performing group exponentiation precomputations. These group exponentiation precomputations generally need only be performed once per sender.

If desired, the bilinear mapping calculations performed by the IBE private key generator 22 in generating the IBE public parameters can alternatively be performed by the senders (e.g., by using engine 14 to perform the bilinear mapping computations as a precomputation for supporting subsequent encryption or encapsulation operations or by using engine 14 to perform the bilinear mapping computations as part of encryption or encapsulation procedures). In this case, parameter $g_2$ or $g_2'$ must be included in the IBE public parameters, while parameter v may be omitted. In this type of scheme, parameter $g_2$ may be represented more compactly than v.

A feature of the IBE schemes of the invention is that the IBE public key ID is used to derive an integer H(ID), which need not be an element of G. The integer H(ID) is used as an exponent in the group exponentiation operations performed during encryption, encapsulation, and key generation (see, e.g., equation 3 for keygen). Allowing the ID to be hashed to an integer is more efficient and more secure than requiring ID to be hashed directly to an element of G.

The IBE schemes of the present invention are secure against adaptive identity attacks in the random oracle model. These schemes are advantageous in that a number of techniques are used to enhance efficiency. For example, group multiplication operations are preferably used instead of bilinear maps during encryption and encapsulation. Efficiency is also enhanced by mapping the IBE public key ID into an integer (a hash of the ID) used as an exponent in the group exponentiation operations for encryption and encapsulation. Improved efficiency can be used to increase throughput (e.g., in high-volume encryption server systems) or to enable low-power operation (e.g., in a mobile device).

The IBE schemes of the present invention are based on the BDH assumption. If desired, security can be enhanced to provide security against chosen ciphertext attacks by using standard padding techniques such as those of Fujisaki and Okamoto in the random oracle model or by using message authentication codes or signatures.

The foregoing is merely illustrative of the principles of this invention and various modifications can be made by those skilled in the art without departing from the scope and spirit of the invention.

What is claimed is:

1. A method for using identify-based-encryption (IBE) to support secure communications, comprising:
    at a sender, using an IBE encryption engine implemented on computing hardware to encrypt plaintext to produce ciphertext, wherein the IBE encryption engine uses as inputs the plaintext, IBE public parameters, and an IBE public key associated with an intended recipient, wherein the IBE encryption engine produces the ciphertext using group multiplication operations and using group exponentiation operations, wherein the group exponentiation operations are performed by computing an integer from the IBE public key and by using the computed integer as an exponent in the group exponentiation operations, and wherein using the group exponentiation operations comprises computing the integer from the IBE public key by hashing the IBE public key; and
    at the recipient, using an IBE decryption engine implemented on computing hardware to decrypt the ciphertext to produce the plaintext, wherein the IBE decryption engine uses as inputs the ciphertext and an IBE private key corresponding to the IBE public key and wherein the IBE decryption engine performs decryption operations using a bilinear map.

2. The method defined in claim 1 further comprising performing setup operations at an IBE private key generator, wherein the setup operations include generating the IBE public parameters.

3. The method defined in claim 1 further comprising performing setup operations at an IBE private key generator, wherein the setup operations include generating the IBE public parameters using bilinear map computations.

4. The method defined in claim 1 further comprising, at the sender, using the IBE encryption engine to perform bilinear map computations.

5. The method defined in claim 1 further comprising performing setup operations at an IBE private key generator, wherein the setup operations include generating the IBE public parameters using bilinear map computations and wherein using the IBE encryption engine to perform the group exponentiation operations at the sender comprises using the IBE encryption engine to perform the group exponentiation operations without performing bilinear map operations.

6. The method defined in claim 1 further comprising using an IBE private key generator to publish the IBE public parameters by providing the IBE public parameters to an IBE public parameter host.

7. The method defined in claim 1 wherein the exponentiation operations used by the IBE encryption engine are performed on fixed bases that depend solely on the IBE public parameters.

8. The method defined in claim 1 further comprising using a private key generator to generate the IBE private key corresponding to the IBE public key, wherein generating the private key comprises using group multiplication and a hash of the IBE public key.

9. The method defined in claim 1 further comprising:
    using multiple private key generators to generate a plurality of respective private key shares corresponding to the IBE public key; and
    at the recipient, assembling the private key shares to form the IBE private key.

10. The method defined in claim 1 wherein using the IBE decryption engine to decrypt the ciphertext to produce the plaintext comprises using an asymmetric bilinear map to decrypt the ciphertext to produce the plaintext.

11. A method for using identity-based-encryption (IBE) to support key exchange operations, comprising:
    at a sender, using an IBE encapsulation engine implemented using computing hardware to produce a secret key and an encapsulated version of the key, wherein the IBE encapsulation engine uses as inputs IBE public parameters and an IBE public key associated with an intended recipient, wherein the IBE encapsulation engine produces the encapsulated key using group multiplication operations and using group exponentiation operations, wherein the group exponentiation operations are performed by computing an integer from the IBE public key and by using the computed integer as an exponent in the group exponentiation operations, and wherein using the group exponentiation operations comprises computing the integer from the IBE public key by hashing the IBE public key; and at the recipient, using an IBE unencapsulation engine implemented on computing hardware to unencapsulate the encapsulated key to reveal the secret key, wherein the IBE unencapsulation engine uses as inputs the encapsulated key and an IBE private key corresponding to the IBE public key and wherein the IBE unencapsulation engine performs unencapsulation operations using a bilinear map.

12. The method defined in claim 11 further comprising performing setup operations at an IBE private key generator, wherein the setup operations include generating the IBE public parameters.

13. The method defined in claim 11 further comprising performing setup operations at an IBE private key generator, wherein the setup operations include generating the IBE public parameters using bilinear map computations.

14. The method defined in claim 11 further comprising, at the sender, using the IBE encapsulation engine to perform bilinear map computations.

15. The method defined in claim 11 further comprising performing setup operations at an IBE private key generator, wherein the setup operations include generating the IBE public parameters using bilinear map computations and wherein using the IBE encapsulation engine to perform the group exponentiation operations at the sender comprises using the IBE encapsulation engine to perform the group exponentiation operations without performing bilinear map operations.

16. The method defined in claim 11 further comprising using an IBE private key generator to publish the IBE public parameters by providing the IBE public parameters to an IBE public parameter host.

17. The method defined in claim 11 wherein the exponentiation operations used by the IBE encapsulation engine are performed on fixed bases that depend solely on the IBE public parameters.

18. The method defined in claim 11 further comprising using a private key generator to generate the IBE private key corresponding to the IBE public key, wherein generating the private key comprises using group multiplication and a hash of the IBE public key.

19. The method defined in claim 11 further comprising:
using multiple private key generators to generate a plurality of respective private key shares corresponding to the IBE public key; and
at the recipient, assembling the private key shares to form the IBE private key.

20. The method defined in claim 11 wherein using the IBE unencapsulation engine to unencapsulate the encapsulated key to reveal the secret key comprises using an asymmetric bilinear map to unencapsulate the encapsulated key.

* * * * *

UNITED STATES PATENT AND TRADEMARK OFFICE
CERTIFICATE OF CORRECTION

PATENT NO. : 7,590,236 B1  Page 1 of 1
APPLICATION NO. : 11/090450
DATED : September 15, 2009
INVENTOR(S) : Boneh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1149 days.

Signed and Sealed this

Twenty-first Day of September, 2010

David J. Kappos
*Director of the United States Patent and Trademark Office*